United States Patent [19]
Pedersen et al.

[11] 3,870,945
[45] Mar. 11, 1975

[54] INVERTER SYSTEM HAVING SMOOTH SWITCHING BETWEEN OPERATIONAL MODES

[75] Inventors: Niels P. Pedersen, Waterford; John M. Shabel, Erie, both of Pa.

[73] Assignee: General Electric Company, Erie, Pa.

[22] Filed: Feb. 28, 1974

[21] Appl. No.: 446,645

[52] U.S. Cl.............. 321/9 A, 318/227, 321/18, 321/45 R
[51] Int. Cl. ........................................... H02m 1/08
[58] Field of Search............ 321/9 A, 18, 16, 45 R; 318/227

[56] References Cited
UNITED STATES PATENTS
3,207,974  9/1965  McMurray ..................... 321/45 R
3,617,840  11/1971  Salihi ............................ 318/227
3,694,718  9/1972  Graf ............................... 321/9 A
3,819,992  6/1974  Opal ............................. 321/9 A X

*Primary Examiner*—R. N. Envall, Jr.
*Attorney, Agent, or Firm*—Arnold E. Renner

[57] ABSTRACT

In an inverter system for the conversion of direct current power to alternating current power of the type including an inverter circuit selectively operable in either a time ratio controlled (pulse width modulation) or a square wave mode there is provided suitable control means and method of operation to insure a substantially constant voltage-frequency relationship throughout the operating range of the inverter circuit, including the transition period between the two modes of operation.

16 Claims, 10 Drawing Figures

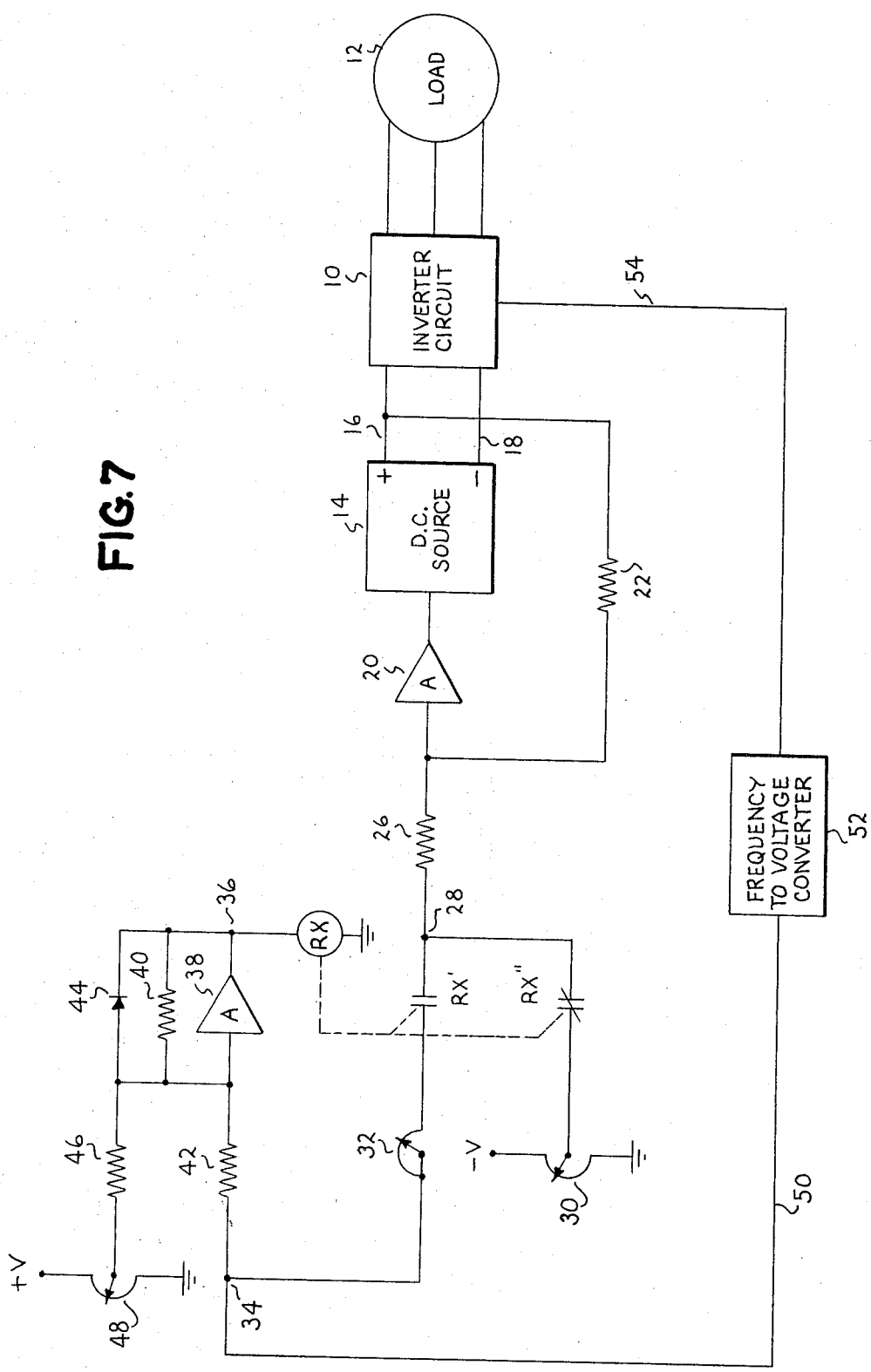

3,870,945

INVERTER SYSTEM HAVING SMOOTH SWITCHING BETWEEN OPERATIONAL MODES

BACKGROUND OF THE INVENTION

The present invention relates generally to power conversion systems of the inverter type and more particularly to inverter systems which are operable in two distinct modes, a time ratio controlled mode (pulse width modulation) and a square wave mode. The present invention is especially applicable to those situations where there is a requirement for a constant voltage-frequency relationship such as inverter systems for supplying power to an alternating current motor.

Inverter circuits generally are well known in the art and in the series inverter system which will be used to illustrate the present invention the inverter is disposed intermediate a source of direct current (d.c.) power and a load. Inverter circuits employ some form of switching means, in today's state of the art usually solid state switching devices such as silicon controlled rectifiers (SCRs) or similar devices, which are selectively operated to alternately connect the load to the respectively different polarities of the d.c. source. Such inverter circuits may be used in either single phase or polyphase applications. In the latter case, a plurality of such individual circuits are utilized, one in each leg of the polyphase system. An example of an inverter circuit such as has been generally described may be found in U.S. Pat. No. 3,207,974, "Inverter Circuits," by W. McMurray, issued Sept. 21, 1965 which patent is assigned to the assignee in the present invention and which is specifically incorporated hereinto by reference.

Inverter circuits such as are shown in the McMurray patent were originally operated only in the square wave mode. By square wave mode it is meant that the switches of the inverter circuit were selectively operated to output an alternating current (a.c.) square wave of the frequency desired for the load application. Voltage control to the load, when required, was normally provided by varying the value of the d.c. source in a manner such that the inverter output voltage as applied to the load varied. As an example, in the case of an a.c. motor (particularly a polyphase a.c. motor) it was known that the average voltage applied is advantageously varied linearly with respect to the frequency of the power supplied.

Applications of inverter circuits as described above are completely adequate for many applications but difficulties were experienced where a wide range of frequencies was desired with an attendant variation in voltage level. For example, many inverter systems such as that shown in the aforementioned McMurray patent utilize a capacitor to commutate or turn off a then conducting SCR. At lower frequencies, and hence lower voltages, the power stored by the capacitor was sometimes insufficient to commutate the SCR resulting in a loss of circuit control. To extend the range of operation and enhance the control of inverter systems, time ratio controlled switching (now perhaps better known as pulse width modulation) of the inverter circuit was developed. In pulse width modulation, the inverter circuit is operated at a fundamental frequency as before but within each half cycle of the inverter output there is provided a period or periods of time in which the switches were operated to provide what is known as "chopping." This chopping action is relatively rapid as compared to the fundamental frequency and by varying the width of any intermediate pulse or chop and by varying the number of chops the average voltage applied to the load can be varied without varying the value of the d.c. source. One system for achieving this time ratio control or pulse width modulation is shown and described in U.S. Pat. No. 3,694,718, "Methods of Inverter Voltage Control by Superimposed Chopping." by C. E. Graf et al which is assigned to the assignee of the present invention and which is specifically incorporated hereinto by reference.

Pulse width modulation, like square wave operation, also has its limitations. It will be recognized that a certain finite time is required for any switching device, including the solid state types such as SCRs, to operate. It is, therefore, obvious that there is a limit upon the number of times that a switch can be caused to function in any given time thus limiting the minimum width of an intermediate operation or a chop within the fundamental output frequency waveshape. Further expansion in the range of operation of inverter circuits was then achieved by utilizing inverter circuits selectively in each of the two modes described. That is, for lower frequency, lower voltage requirements, the inverter is run in a pulse width modulation mode. As the frequency is increased, the number of chops and the width of the pulses is decreased as far as possible, that is, to a single intermediate chop having a width as narrow as the functional limits of the switching devices would allow. Above these frequencies the inverter is operated in a square wave mode and the d.c. source is controlled to provide voltage control in accordance with the variation in the fundamental or square wave frequency.

This dual mode of operation of inverters, although extending the overall range, is not without its problems in that a discontinuity occurs in the output voltage-frequency relationship at the time of transition between the two modes of operation. This can be readily visualized in that, because of the required switching time, it was not possible to reduce the intermediate chop beyond a certain limit. Thus, when the transition is made from pulse width modulation to square wave operation there is a jump in the average voltage applied to the load. While not overly serious in certain applications, a discontinuity present in the voltage-frequency relationship in other applications; e.g. polyphase a.c. motors, can present undesirable operational characteristics. The present invention overcomes this problem of discontinuity.

SUMMARY OF THE INVENTION

It is, therefore, an object of the present invention to provide an improved inverter system.

A further object is to provide an improved inverter system selectively operable in the pulse width modulated and square wave modes.

Another object is to provide an inverter system operable in the pulse width modulated and square wave modes with means to sense the transition and properly compensate to insure a substantially constant voltage-frequency relationship in the system output.

A still further object is to provide a method for correcting potential discontinuities in the output of an inverter system, selectively operable in the pulse width modulated and square wave modes, which occur at the transition between the modes to give a constant voltage-frequency relationship.

The foregoing and other objects are achieved in accordance with the present invention by the determination of the point of transition between the pulse width modulated and square wave modes of operation and by appropriately, in an incremental manner, reducing the value of the d.c. source voltage as applied to the inverter circuit such that the potential discontinuity in the voltage-frequency relationship is compensated for to maintain that relationship substantially linear throughout the operating range of the inverter system.

DESCRIPTION OF THE DRAWINGS

While the specification concludes with claims particularly pointing out and distinctly claiming the invention, the invention may be better understood from the following description taken in conjunction with the accompanying drawings in which:

FIG. 7 is a schematic diagram illustrating the apparatus of the present invention in its preferred embodiment.

DETAILED DESCRIPTION

Before beginning a detailed description of the drawings it should be stated that, while the invention is described in the embodiment of a three phase application, it is to be expressly understood that the number of phases of the inverter output is not critical and that the present invention has equal applicability to single phase systems as well as polyphase systems other than three phase.

Figure 1:
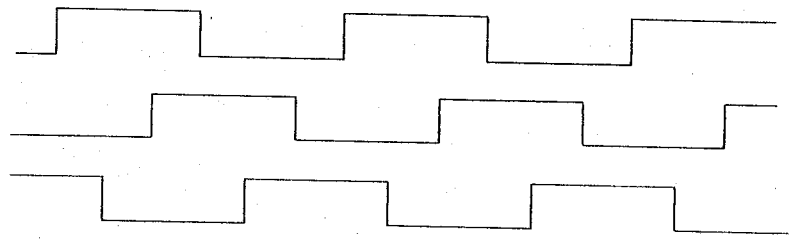
FIG. 1 depicts a typical square wave output of a three phase inverter system.
Figures 2A, 2B, 2C, 2D:
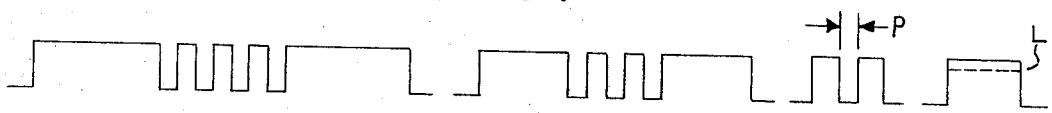
FIGS. 2a – 2d are four one-half cycle wave shapes illustrating the pulse width modulation mode and the transition problems overcome by the present invention.
Figure 3:
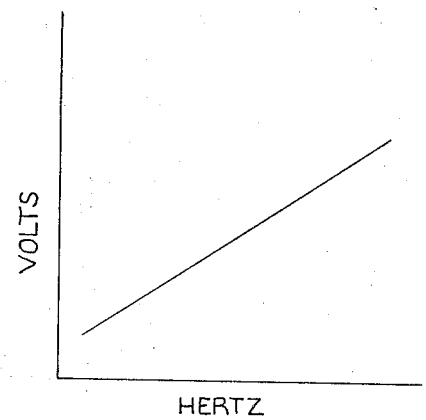
FIGS. 3 and 4 are graphs useful in the understanding of the problem overcome.

FIG. 1, which is included for reader orientation, merely shows a typical three phase square wave output of an inverter system in which the phases are displaced by 120°. FIGS. 2a, 2b and 2c illustrate briefly the operation of an inverter system in the pulse width modulation or chopping mode. These three figures, each a positive half cycle of one output phase, demonstrate that as the frequency is increased, represented by the decreasing period of the half cycles from FIG. 2a to FIG. 2c, the average voltage may be modified by varying the number of chops and/or the width of the chops within each of the half cycles. (It is, of course, to be realized that corresponding chopping occurs in the negative half cycle of each of the phases as well.) As shown, the half cycle of FIG. 2a is of a relatively low frequency and is provided with four chopping pulses while FIG. 2b, an intermediate frequency, has three chopping pulses. FIG. 2c shows but a single chop within the half cycle. In FIGS. 2a through 2c, chopping occurs only in the middle 60° of each half cycle as is explained in the aforementioned Graf et al. U.S. Pat. No. 3,694,718. It is, however, to be understood that this chopping could occur for greater or lesser portions of the half cycle, including the full 180°. By the judicious application of the chopping within the respective half cycles of each phase, the voltage relationship to the frequency can be maintained substantially linear as is illustrated in the idealized curve shown in FIG. 3.

Referencing now specifically FIG. 2c, let it be assumed that the half cycle there illustrated represents the highest frequency at which the inverter can operate in the pulse width modulation mode and that the width of the chop, represented by the distance P, is the minimum amount of time which must be allowed for the operation of the switches. If application of the inverter above this frequency is desired, it will be necessary to now switch to a square wave mode of operation as illustrated in FIG. 2d. Assuming the same period for the wave shapes of FIGS. 2c and 2d, it is readily seen that the average voltage of the FIG. 2c wave shape is somewhat less than the peak voltage as is illustrated by the dotted line L shown in FIG. 2d.

Figure 4:
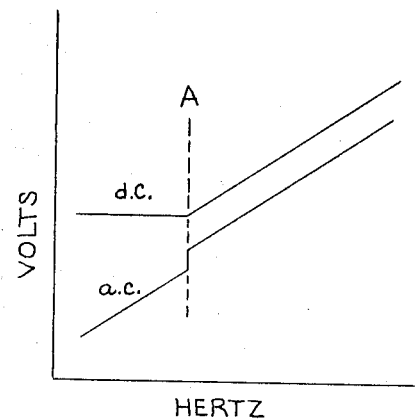

FIG. 4 illustrates what would happen if the switch were made from the pulse width modulation mode of operation to the square wave mode of operation without some form of compensation. The depiction of FIG. 4, which plots voltage against output frequency, shows (upper graph labeled d.c.) that the source voltage is held at a constant level throughout the lower frequency operational range representing that portion of the time in which the inverter is running in the pulse width modulation mode. To the right of point A it is seen that the d.c. voltage is increased representing the increasing voltage of the source which is required for square wave mode of operation to maintain the linear voltage-frequency relationship. The lower curve illustrates the inverter output voltage occurring in this hypothetical situation. It is seen that at the time corresponding to point A on the d.c. curve there is an incremental increase in the a.c. output due to the incremental jump in the d.c. level applied to the load by virtue of the sudden disappearance of the intermediate chop in the output wave shape. With reference to FIG. 2d, this increase is represented by the difference between the dotted line L and the peak of the square wave. From FIG. 4 it is obvious that operation of the inverter in this manner would not provide the constant relationship desired in that, although the slopes of the a.c. line segments above and below point A may be the same, they are displaced one from the other.

Figure 5:
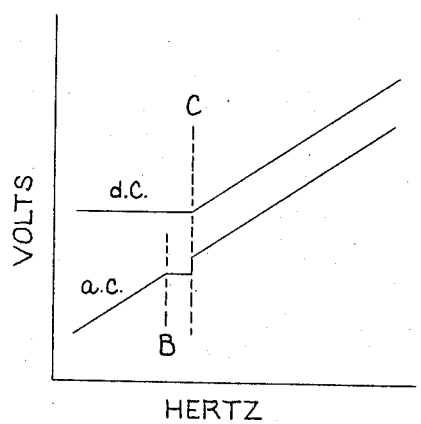
FIG. 5 illustrates the prior art approach in the use of an inverter system in the dual mode of operation.

In the prior art the potential problem illustrated by FIG. 4 was minimized by establishing the relationship illustrated in FIG. 5. FIG. 5 is similar to FIG. 4 in that it provides two graphs one representing the d.c. source voltage and the second the a.c. output of an inverter. Similarly to FIG. 4, the point at which the transition between pulse width modulation and square wave operation occurs is shown at point C which corresponds to point A in FIG. 4. As depicted in FIG. 5, with the transition point being known, the pulse or intermediate chop was held constant from a frequency below that which the transition was to be made to the point of transition resulting in a substantially horizontal plateau in the a.c. output shown by the horizontal section of the a.c. line between points B and C. By the proper selection of the period for holding the pulse modulation or chopping constant, the incremental change in the a.c. output can be located such that upon occurrence, the a.c. output voltage will essentially be put back on the desired linear voltage-frequency characteristic. While this system does operate in a more satisfactory manner than an uncompensated system as represented by the graphs of FIG. 4 it is evident that operation of the inverter system within the frequency range represented by the distance between points B and C is not within the confines of the linear characteristic and does represent a discontinuity in apparatus application which may be detremental in certain instances.

Figure 6:
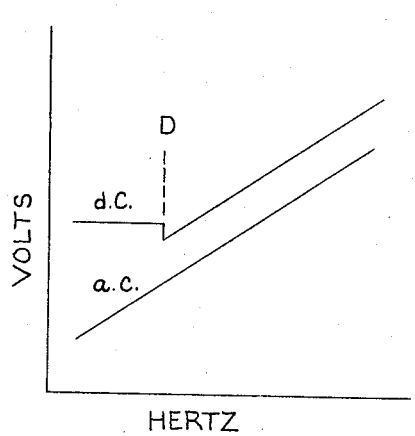
FIG. 6 is a graph useful in the understanding of the present invention.

FIG. 6 demonstrates the manner in which the present invention alleviates the problems attendant to the prior art. In FIG. 6 there is again shown the two lines representing the d.c. voltage of the source and the a.c. output. As before, the d.c. source voltage is held constant during that portion of system operation during which the inverter is operating in the pulse width modulation mode; i.e. until point D. At the instant of switching between modes of operation, point D, there is a substantially instantaneous incremental decrease in the d.c. source voltage which will compensate and correct for the omission of the pulse from each half cycle such that the output of the inverter remains substantially linear as shown in the lower graph (labeled a.c.).

The means by which the depiction of FIG. 6 is accomplished, in accordance with the preferred embodiment of the present invention, is shown in the schematic representation of FIG. 7. With specific reference now to FIG. 7 there is included an inverter circuit 10 which may be, for example, of the type referenced in the aforementioned Graf et al. U.S. Pat. No. 3,694,718 and which is operable in either a square wave or the pulse width modulation mode. Block 10 represents both the inverter circuit per se as well as its control and the means for determining the point of transition between the two modes of operation, the details of which do not form a portion of the present invention and are all well known in the art. The output of inverter 10 is shown as a three phase output supplied to a suitable load 12 such as a three phase a.c. motor. Inverter circuit 10 is powered from a d.c. source 14 by way of two leads 16 and 18 connected respectively to the arbitrarily designated positive and negative output terminals of the source 14. Source 14 may be of any known type which is controllable in response to an input control signal, for example, a power supply which rectifies power from an a.c. source through a phase controlled SCR bridge to provide a d.c. bus voltage. Control for the d.c. source 14 is provided by an input amplifier 20 which supplies a control signal to the d.c. source to control the output voltage thereof and a feedback resistor 22 connected between the positive terminal (lead 16) of the source and the input to the amplifier 20 at a junction 24. The second input to junction 24 is by way of an input scaling resistor 26 the free end of which is connected to a junction 28.

A potentiometer 30 is connected between a reference voltage −V and ground with its wiper arm connected through a normally closed contactor RX″ to junction 28. Potentiometer 30 represents any suitable means for providing a reference voltage of a fixed value to the input of the amplifier 20 and hence a fixed control signal to the d.c. source 14 when the inverter circuit is operating in the pulse width modulation mode (corresponding to the horizontal portion of the d.c. curve in FIG. 6).

Junction 28 has a second input through a normally open contact RX′ in series with a potentiometer 32 which performs a scaling function and represents what is termed a "volts per hertz" potentiometer. The free end of potentiometer 32 is connected to a junction 34 and it will be readily seen that upon the opening of contact RX″ and the closing of RX′ the signal appearing at junction 34, as scaled by the potentiometer 32 and the resistor 26, will form an input to the amplifier 20 which in turn will control the level of the d.c. voltage source output.

The two contacts RX′ and RX″ are, as is indicated by the dotted line connection, mechanically ganged such that only one can be closed at any one time and are under the control of a suitable relay coil Rx. It is to be understood that the relay coil RX and its related contacts RX′ and RX″ are utilized to represent a switching function and that other switching devices such as suitably controlled semiconductor devices could be employed to perform this function with equal facility.

Coil RX is connected between ground and a junction 36 to which junction there is supplied the outputs of an operational amplifier 38 and a diode 44. A first resistor 40 connected between the output and input of the amplifier 38 and a second resistor 42 in series with the input of the amplifier 38 as is well known in the art. The anode of diode 44 is connected through a scaling resistor 46 to a second reference source. This second reference source is shown as a potentiometer 48 connected between a positive reference voltage (+V) and ground. The junction of resistor 46 and diode 44 is connected to the input side of amplifier 38.

Junction 34, which through resistor 42 forms an input to the amplifier 38, is further connected via a line 50 to a frequency to voltage converter 52 which is controlled from the inverter circuit 10 via a line 54 to provide to junction 34 a signal which is proportional to the fundamental frequency of the inverter circuit 10. The frequency to voltage converter 52 may be of any of several well known types the details of which are not critical to the present invention. Normally, however, such converters will sense the leading edge of a pulse (for example the leading edge of each positive going pulse of the fundamental frequency) and provide an output pulse of a fixed magnitude in response thereto. Through an integration function, then, the output voltage of the converter will be directly proportional to the value of the frequency of operation. In the present instance, of course, some means must be further included to distinguish between the leading edge of the fundamental frequency and the leading edges of the superimposed chopping frequency. This could be done on the basis of pulse duration in a manner well known in the art.

The operation of the circuit in FIG. 7 is as follows. It will be remembered that the output of the d.c. source 14 was stated to be a function of the input control signal from the amplifier 20 which in turn is dependent upon the value of the voltage at junction 28. In the operation of the inverter system, at lower frequencies the relay RX and its associated contacts will be in the position shown with RX′ open and RX″ closed. Thus the voltage appearing at junction 28 will be a function of the setting of potentiometer 30; that is, a fixed reference voltage. The output of the d.c. source will thus be a constant value as is indicated by the horizontal portion of the d.c. curve of FIG. 6 and will be the d.c. voltage supplied to the inverter circuit 10 while operating in the pulse width modulation mode.

The opening of contact RX'' and closing of contact RX' is achieved by utilizing amplifier 38 in a switching mode. It will be remembered that the output of the frequency to voltage converter 52, which is directly proportional in magnitude to the frequency of the inverter 10, is applied as the input to the junction 34 which serves as the input to the amplifier 38. The setting of potentiometer 48 provides a reference voltage which determines the point at which the switching between the two modes of operation of the inverter will occur. These two voltages, positive from potentiometer 48 and negative from the converter are seen by both the amplifier 38 and the diode 44. Thus, so long as the negative voltage on line 50 is below the value of the reference from the potentiometer 48, the output of the amplifier will be relatively small because it is bypassed by the diode 44. When, however, the voltage on line 50 exceeds the magnitude of the reference from the potentiometer 48, amplifier 38 will be caused to output a significant signal which will cause the operation of the relay coil RX. With the energization of the relay coil, contact RX'' will open and contact RX' will close thus applying the signal from the frequency to voltage converter 52 via the adjustment potentiometer 34 to junction 28 to serve as the input to the amplifier 20. Because the magnitude of the signal on line 50 is directly proportional to the inverter frequency, the output of the d.c. source will now vary as a function of the frequency. Operating in the reverse direction, as the frequency of the inverter circuit decreases, a point will be reached where the value of the signal from the potentiometer 48 will exceed that from the converter 52 to actuate the relay coil RX and apply the signal from potentiometer 30 to junction 28.

Thus it is seen, by properly scaling the values of the signals from the frequency to voltage converter 52 (e.g., by use of the potentiometer 32) and the potentiometer 48, that at the point of transition between square wave operation and pulse width modulation operation the control voltage supplied to and regulating the output voltage of the d.c. source 14 can be controlled with great accuracy. As such, it is readily seen that by assuring that the voltage applied to junction 28 through contact RX' is appropriately less than that applied through contact RX'' the value of the d.c. source output may be incrementally adjusted at the transition point between the two modes of inverter operation. As illustrated in FIG. 6, the incremental change in the direct current source output will effect the desired linear relationship in the output of the inverter circuit.

While there has been shown and described what is at present considered to be the preferred embodiment of the present invention, modifications thereto will readily occur to those skilled in the art. For example, as previously mentioned, the relay utilized to perform the switching function could be replaced by other forms of switching, such as solid state switches. In addition, the illustrated means of establishing the requisite reference voltages and their cooperation are to an extent a matter of design choice and can be modified accordingly. It is not desired, therefore, that the invention be limited to this specific arrangement shown and described and it is intended to cover in the appended claims all such modifications as are within the true spirit and scope of the invention.

What is claimed is:

1. In an inverter system including an inverter circuit for converting direct current power from a source to alternating current power of the type operable in both the pulse width modulation and square wave modes, means to maintain a substantially constant voltage-frequency relationship of the system output comprising:
   a. means for maintaining the voltage of the direct current power source substantially constant during operation of said inverter circuit in the pulse width modulation mode;
   b. means for varying the voltage of the direct current power source proportionally to the desired output frequency of the inverter circuit during operation in the square wave mode;
   c. means to determine when a change in operational mode of said inverter circuit is to be made; and,
   d. means operative at the time of making a change between the two modes of operation of the inverter circuit to effect a substantially instantaneous incremental change in the value of the direct current source voltage.

2. The invention in accordance with claim 1 wherein said means to determine when a change in the operation mode is to be made includes means responsive to the output frequency of the inverter circuit for developing a level signal proportional thereto.

3. The invention in accordance with claim 2 further including means to provide a reference signal and means to compare said reference signal and said level signal to provide an output signal operable to effect said incremental change.

4. A control system for an inverter circuit operable in two distinct modes, a pulse width modulation mode and a square wave mode, to provide a substantially constant voltage-frequency relationship over a range of output frequencies from the inverter circuit, said inverter circuit receiving input power from a controllable direct current power source, comprising:
   a. first reference means for providing a first control signal operable to maintain the output voltage of said direct current power source substantially constant when the inverter circuit is operating in the pulse width modulation mode:
   b. second reference means for providing a second control signal operable to vary the output voltage of said direct current power source when said inverter circuit is operating in the square wave mode;
   c. means to scale the relative values of said first and second control signals;
   d. determining means for determining when a change in operational mode of said inverter circuit is to be made; and,
   e. switching means responsive to said determining means for selectively rendering said first and second control signals effective whereby, because of the relative values of said control signals, at the time of switching between effective control signals there is provided a substantially instantaneous change in the output voltage of said direct current power source.

5. The invention in accordance with claim 4 wherein said second control signal is proportional to the output frequency of the inverter circuit.

6. The invention in accordance with claim 5 wherein there is further included a third reference means and said determining means responds to a comparison of said second and said third control signals.

7. A control system for an inverter circuit operable in two distinct modes, a pulse width modulation mode and a square wave mode, to provide a substantially constant voltage-frequency relationship over a range of output frequencies from the inverter circuit, said inverter circuit receiving input power from a controllable direct current power source, comprising:
  a. first reference means for providing a first control signal operable to maintain the output voltage of said direct current power source substantially constant when the inverter circuit is operating in the pulse width modulation mode;
  b. second reference means for providing a second control signal which varies proportionally to the output signal from said inverter circuit;
  c. third reference means to provide a third control signal indicative of the operational point of the inverter circuit at which the operational mode changes;
  d. switching means responsive to said second and third control signals for removing said first control signal from said direct current power source and causing said second control signal to control said direct current power source to first effect a substantially incremental change in the output voltage and to thence vary said output voltage proportionally to said second control signal.

8. The invention in accordance with claim 7 further including means to scale the relative values of said first and second control signals to thereby effect the incremental change in the output voltage of said direct current power supply.

9. An inverter system for supplying alternating current power of varying voltage and frequency to a load from a controllable source of variable voltage direct current power comprising:
  a. an inverter circuit selectively operable in either of two modes, a pulse width modulation mode and a square wave mode;
  b. means to connect said inverter circuit to the source of variable voltage direct current power; and,
  c. means for controlling the voltage supplied from the source to said inverter circuit including:
    1. means to develop a signal proportional to the output frequency of said inverter circuit,
    2. means responsive to said signal for maintaining the output voltage of said source substantially constant when the inverter circuit output frequency is below a prescribed level and operating in the pulse width modulation mode and for varying the output voltage of said source proportionally to the inverter output frequency when said frequency is above the prescribed level and operating in the square wave mode, and,
    3. means responsive to said signal to determine when a switch in mode of inverter circuit operation is to be made and to effect a substantially instantaneous incremental change in the output voltage of the source when a switch is made.

10. The invention in accordance with claim 9 wherein the means responsive to said signal is a switching means for selectively utilizing, as a control function for said source of direct current power, said signal and a further signal of constant value.

11. The invention in accordance with claim 10 wherein the incremental change is effected by the relative scaling of said signal and said further signal.

12. The invention in accordance with claim 10 wherein the incremental change is effected by scaling the values of said signal and said further signal such that at the time of switching the magnitude of said signal is less than the magnitude of said further signal.

13. A method of maintaining a substantially linear relationship between the output voltage and the output frequency of an inverter circuit supplied by a source of direct current power throughout a range of inverter output frequencies comprising:
  a. operating said inverter in a pulse width modulation mode throughout a first portion of the range of frequencies using a substantially constant source of direct current voltage;
  b. operating said inverter in a square wave mode of operation through a second portion of the range of frequencies using a varying source of direct current voltage;
  c. determining the point of switching between the two modes of operation; and,
  d. effecting a substantially instantaneous change in the direct current power applied to the inverter at the time of switching to thereby maintain the linear relationship.

14. The method in accordance with claim 13 where the point of switching is determined by:
  a. providing a first signal proportional to the output frequency of the inverter circuit;
  b. providing a second signal indicative of the desired point of switching; and,
  c. comparing said first and second signals to effect the determination.

15. A method of maintaining a substantially linear relationship between the output voltage and the output frequency of an inverter circuit supplied by a source of variable voltage direct current power throughout a range of inverter output frequencies comprising:
  a. providing a first control signal of constant value;
  b. supplying said first control signal to said source to maintain its output voltage constant while operating said inverter in a pulse width modulation mode;
  c. providing a second control signal having a value which varies proportionally to the output frequency of said inverter circuit;
  d. supplying said second control signal to said source to vary its output voltage in accordance with the value of said second control signal while operating said inverter in a square wave mode;
  e. determining the frequency of inverter output for changing between modes of inverter operation; and,
  f. effecting a substantially instantaneous change in the voltage of said source at the time of switching to thereby maintain said substantially linear relationship.

16. The method in accordance with claim 13 wherein the step of determining the frequency of changing modes of operation comprises the steps of:
  a. providing a third control signal of constant value; and,
  b. comparing said second and third control signals to provide a switching signal operative to effect said change.

* * * * *